US008327450B2

(12) United States Patent
Clement et al.

(10) Patent No.: US 8,327,450 B2
(45) Date of Patent: Dec. 4, 2012

(54) DIGITAL SAFETY DEPOSIT BOX

(75) Inventors: Steven D. Clement, Cornelius, NC (US); Michael Thomas Duke, Monroe, NC (US)

(73) Assignee: Wells Fargo Bank N.A., Charlotte, NC (US)

( * ) Notice: Subject to any disclaimer, the term of this patent is extended or adjusted under 35 U.S.C. 154(b) by 1028 days.

(21) Appl. No.: 11/780,289

(22) Filed: Jul. 19, 2007

(65) Prior Publication Data

US 2009/0025090 A1 Jan. 22, 2009

(51) Int. Cl.

| | |
|---|---|
| ***G06F 7/04*** | (2006.01) |
| ***G06F 17/30*** | (2006.01) |
| ***G06F 11/30*** | (2006.01) |
| ***G06F 12/14*** | (2006.01) |
| ***H04N 7/16*** | (2011.01) |

(52) U.S. Cl. ............................ 726/26; 726/27; 713/189

(58) Field of Classification Search .................... 726/26, 726/27; 713/189

See application file for complete search history.

(56) References Cited

U.S. PATENT DOCUMENTS

| | | | | |
|---|---|---|---|---|
| 6,950,943 | B1 * | 9/2005 | Bacha et al. | 726/21 |
| 6,954,753 | B1 | 10/2005 | Jeran | |
| 7,089,424 | B1 * | 8/2006 | Subbiah | 713/189 |
| 7,587,366 | B2 * | 9/2009 | Grim et al. | 705/51 |
| 2004/0121790 | A1 * | 6/2004 | Wolff et al. | 455/518 |
| 2006/0085344 | A1 * | 4/2006 | Grim et al. | 705/51 |
| 2006/0111917 | A1 * | 5/2006 | Dhanakshirur | 704/277 |
| 2008/0155540 | A1 * | 6/2008 | Mock et al. | 718/100 |
| 2008/0168135 | A1 * | 7/2008 | Redlich et al. | 709/204 |
| 2008/0184329 | A1 * | 7/2008 | Cross et al. | 726/1 |
| 2008/0198981 | A1 * | 8/2008 | Skakkebaek et al. | 379/88.13 |
| 2009/0276215 | A1 * | 11/2009 | Hager | 704/235 |

OTHER PUBLICATIONS

More Than a Pretty Face, Biometrics and SmartCard Tokens Gregory Williams © SANS Institute 2002.*

Microsoft® Computer Dictionary, Fifth Edition Publisher: Microsoft Press Pub. Date: May 1, 2002 Definitions: log off—log on & pass-through—password attack.*

Electronic Notarization Why It's Needed, How It Works, and How It Can Be Implemented to Enable Greater Transactional Security Daniel J. Greenwood, Esq. Jan. 2006.*

U.S. News. David Lagesse. Technology: The online safety-deposit box. Posted Jun. 20, 2005. http://www.usnews.com/usnews/culture/articles/050620/20tech.htm.

Xdrive. Online Storage. http://www.xdrive.com/. Last accessed Jul. 29, 2008.

bV Online Data Storage. bigVault. digital safe deposit VAULT. http://www.bigvault.com/. Last accessed Jul. 29, 2008.

BNET.com. Digi-Data Acquires bigVAULT, Inc.; Virtual Safety Deposit Box Company Provides a Safe, Secure Place to Save Irreplaceable Documents for PC Users Worldwide. http://findarticles.com/p/articles/mi_m0EIN/is_2006_March_6/ai_n16090692. Last accessed Jul. 29, 2008.

KeepYouSafe.Com Technical Overview—White Paper. Copyright 2006, Information Survival, LLC. http://www.keepyousafe.com/KeepYouSafe-Technical-Overview-White-Paper.pdf.

* cited by examiner

*Primary Examiner* — Kambiz Zand
*Assistant Examiner* — Benjamin Kaplan
(74) *Attorney, Agent, or Firm* — Kegler Brown Hill & Ritter; James J. Pingor

(57) ABSTRACT

A system that enables secure data storage into a third party managed electronic storage vault is disclosed. This electronic storage vault provides customers with a secure location to store important data such as insurance policies, automobile titles, deeds, wills, birth certificates, tax documents or the like. An interface can be provided which secures (e.g., encrypts, digitally signs) data related to transmission, storage and retrieval. A management component can be employed to regulate (e.g., authenticate) deposit or access of documents to/from the storage vault.

20 Claims, 10 Drawing Sheets

DIGITAL SAFETY DEPOSIT BOX

BACKGROUND

Today, many financial institutions offer customers physical space by which they can secure valuables, for example, jewelry and important documents such as life insurance policies, deeds, wills, titles, etc. These physical spaces are referred to as safety deposit boxes, or sometimes safe deposit boxes. In general, the boxes are technically a safe and are usually located within the bank's main vault, which adds to the security of the box.

Essentially, many customers pay a fee to use safety deposit boxes to prevent loss due to fire, theft, unintentional misplacement, or other undesired situation. Of course, safeguards are put into place to ensure the safety and security of the contents of the safety deposit box. For example, a specific key (or sometimes code) can be assigned to the renter of a box. In order to access the contents of the box, once a customer proves identity and provides a valid signature, oftentimes, the financial institution's master key must be used in addition to the customer's assigned key to gain entry into the box.

As the digital age advances, many banks are incorporating physical biometrics into security of contents of safety deposit boxes. For example, physical biometric authentication technologies can be used to measure and analyze human physical characteristics to validate identity for authentication purposes. Examples of these characteristics include fingerprints, retinas, facial features, hands whereby, the systems can be used to permit entry based upon scanning of these unique physical features and/or characteristics.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that enables secure data storage into a third party managed electronic storage vault. In a specific example, a financial institution can leverage its trusted reputation by hosting an electronic storage vault. This electronic storage vault provides customers with a secure location to store important data such as insurance policies, automobile titles, deeds, wills, birth certificates, tax documents or the like. Additionally, any desired electronic media can be stored within the electronic storage vault.

In another aspect of the subject innovation an interface can be provided which secures data related to transmission, storage and retrieval. For instance, data can be encrypted such that unauthorized, unintentional or malicious disclosure can be prevented. Still further, the data can be digitally signed which can confirm veracity or authenticity of the data.

In a specific example, an interface component can be incorporated into a kiosk which provides a convenient gateway for users to deposit data into an electronic vault. This kiosk can also include an image capture device (e.g., scanner) that enables hard copy documents to be converted to soft copies for transfer and storage within the storage vault.

A management component can be employed to regulate access to the storage vault. More particularly, authentication mechanisms can be employed to regulate the ability to deposit or access documents to/from the storage vault. The authentication mechanisms can verify both digital as well as physiological identity of a user. Still further, the management component can include a rendering component capable of rendering documents to a user in original form as well as 'legally presentable' and 'electronically notarized' form.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
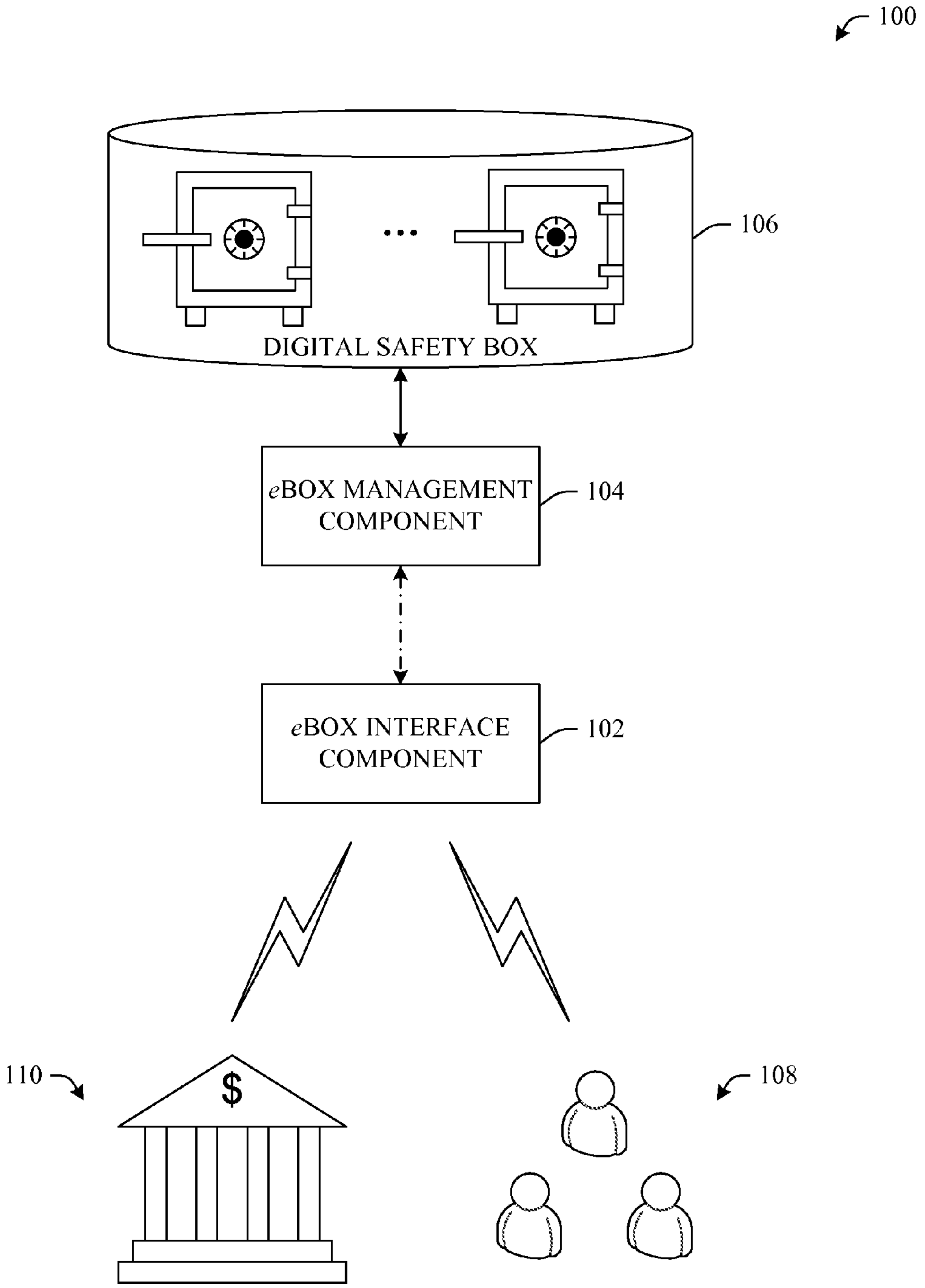
FIG. 1 illustrates a system that facilitates secure of storage into an electronic vault in accordance an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that enables an electronic vault in accordance with aspects of the innovation. This electronic vault or 'eVault' system provides a mechanism for data and/or documents to be stored in a secure location controlled by a third party (e.g., financial institution). In one example, a financial institution can provide electronic data storage services to users and customers. It will be appreciated that because financial institutions inherently have a trusted reputation, customers will most likely entrust their most sensitive data (e.g., wills, contracts, titles, tax documents, password lists, voice/audio files, video files, etc.) to these storage locations.

Generally, the system 100 can include an eBox interface component 102 and an eBox management component 104 which provide access to a digital safety deposit box (or eBox) 106. In operation, a customer 108 or other entity 110 (e.g., financial institution, downstream bank) can transmit data and/or documents by way of the interface component 102 to the digital safety box 106. Essentially, the management component 104 can control access to/from individual safety boxes within the digital safety box 106.

As will be described below, the interface component 102 can provide secure transmission 'over the wire' for example, SSL (secure socket layer) protocol. As well, the interface component 102 can provide encryption as well as digital signature services. Features and benefits of this functionality will be described in connection with the figures that follow. Moreover, although the interface component 102 and the management component 104 are illustrated as separate and distinct components, it is to be understood that these components can be collocated in accordance with alternative aspects of the innovation. Additionally, it is to be understood that multiple interface component 102 and/or management component 104 can be employed in a single component to integrate and facilitate storage/retrieval services in connection with digital safety box 106.

It is to be understood that system 100 provides a modern electronic process and security for electronic assets similar to that of traditional safety deposit boxes which provide physical process and security for physical assets. As will be described in greater detail infra, system 100 enables customers to upload, store and access electronic information within a secure location. Further, because the location is secured by a trusted third party, customers can feel assured that the information cannot be seen by any unauthorized third party. In some aspects, as will be described infra, access can even be prohibited such that the third party cannot view (or access) the data, for example, in an encrypted environment.

Still further, the information stored can be digitally signed such that the stored information cannot be changed or tampered with in any way. Again, this enhances the trust level of the customer that stores the information. Essentially, system 100 provides a trusted and secure location whereby users can store electronic information while maintaining a level of trust not afforded by conventional remote backup systems. In aspects, the innovation provides an automated process for transmitting, encrypting, signing, storing and accessing electronic documents for safe keeping within a secure environment. The electronic access controls can ensure that unauthorized access to stored documents is prohibited and all access can be audited. As with physical safety deposit boxes, the owner of the information can limit access to the electronically stored information as desired.

In accordance with the innovation, the digital safety box or vault 106 provides a centralized and secure document storage facility. As will be described herein, the innovation provides storage that can be identity (or role) based. In other words, identity, role, relationship, permission, etc. can be employed to authenticate a user (or entity) in order to permit (authorize) storage and/or access to data within the electronic vault 106.

The features, functions and benefits of the innovation can be employed in most any scenario, including but not limited to, business to consumer, business to government and consumer to government environments. In example business to consumer environments, the system can provide auto warranty storage and expiration notification, insurance assets inventory services, instant asset inventory document storage for goods purchased, etc. In example business to government scenarios, the innovation can provide for internal revenue service (IRS) audit reporting services, document recovery and certification, legal documentation recovery and certification, etc. Finally in example consumer to government scenarios, the innovation can provide for automatic mail storage via electronic means, automatic filter of 'junk' mail, etc. While specific examples are described herein, other examples exist that are to be included within the scope of this disclosure and claims appended hereto.

Figure 2:
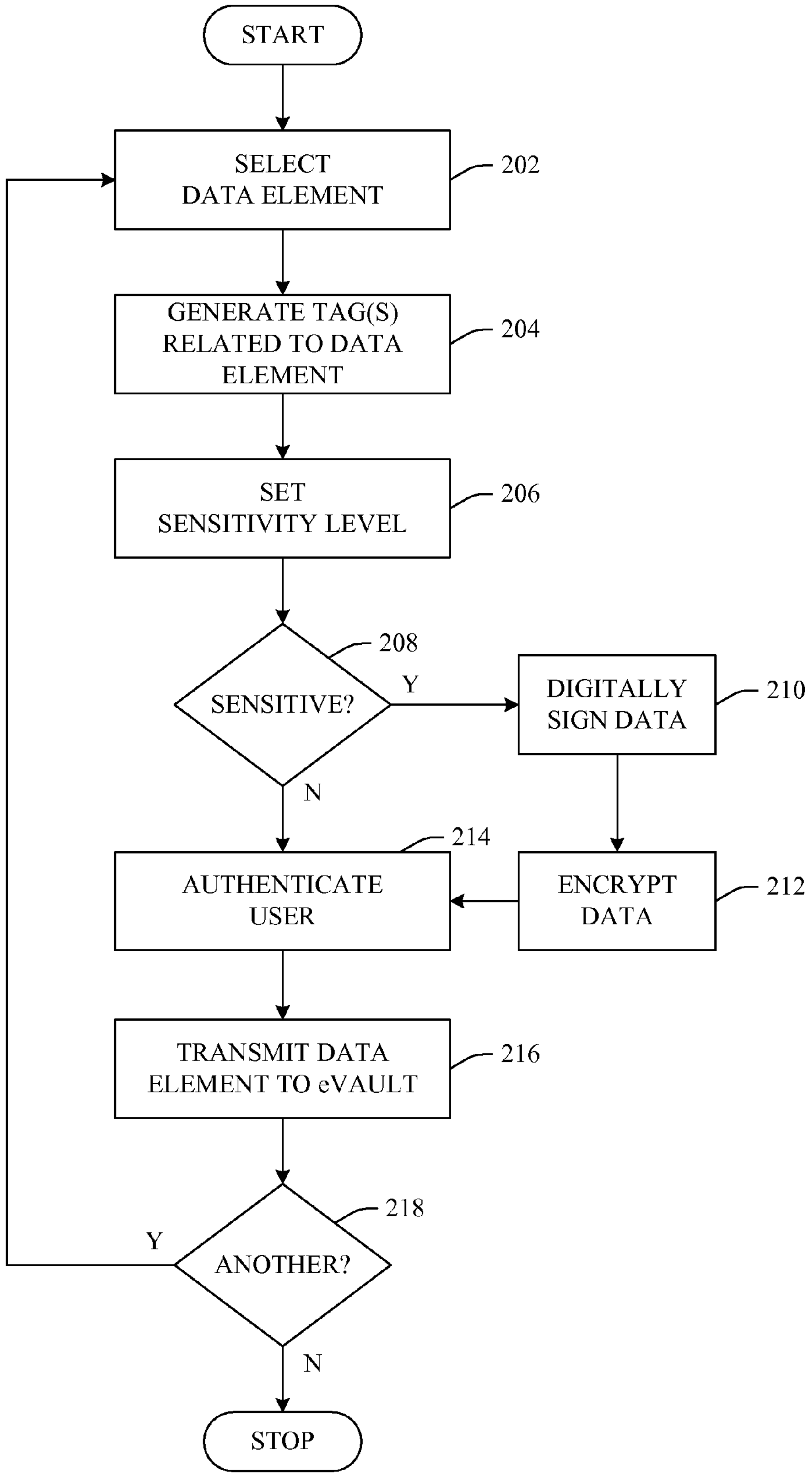
FIG. 2 illustrates an example flow chart of procedures that facilitate storage of data into an electronic vault in accordance with an aspect of the innovation.

FIG. 2 illustrates a methodology that facilitates storage of data into an electronic eVault in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, a data element is selected for transmission and ultimate storage within a third party controlled eVault facility. Contrary to conventional third party 'backup systems' which back up complete computer systems, as shown in 202, the innovation described herein enables users to select which documents and/or data they wish to secure within the third party controlled secure location. In order to effectively manage the storage and subsequent retrieval of the information, the innovation enables manual and/or automatic tag or metadata generation.

At 204, tags can be generated that describe the selected data element(s). In one aspect, these tags can be manually generated by a user. For example, a user can tag a document with words such as '2006 Federal Tax Return' or 'Porsche Automobile Title.' These tags can be attached to the data as metadata such that an index can be employed to map the tags to the appropriate document(s) or data element(s). Upon retrieval, the documents can be located by these tags in addition to the specific document title.

In other aspects, tags or metadata can be automatically generated. By way of example, content analysis can be performed to generate key words and/or phrases by which to tag the documents. Additionally, contextual factors can be captured and used as tags for particular data elements. Here, origination date, time, storage date, time, etc. can be employed to tag specific documents. While specific examples are given herein, it is to be understood that most any tagging scheme or descriptors can be employed without departing from the spirit and/or scope of the innovation. These additional aspects are to be included within the scope of this disclosure and claims appended hereto.

Sensitivity level can be set at 206 in accordance with a particular data element or storage session. As described with respect to the tagging scheme, the sensitivity level can be manually or automatically set on behalf of a user. As well, policies and preferences can be predefined to set sensitivity levels. Content analysis can be employed to establish an appropriate sensitivity level. Here, it can be understood that photos of a vacation will most likely have a lower sensitivity level than that of tax documents. The sensitivity level can be used to determine a level of protection as well as other storage criteria.

At 208, a decision is made to determine if the data element(s) is to be considered sensitive. It is to be understood that the system can employ multiple levels of sensitivity (e.g., low, medium, high) as appropriate. If it is determined that the data is sensitive, the data element can be digitally signed at 210. As will be understood, this digital signature can prohibit modification or tampering of the data element. As well, the data can be encrypted at 212 thereby protecting the data from unintentional or malicious access by unauthorized users.

Whether deemed sensitive or not, before allowing access to the eVault, the user can be authenticated at 214. It is to be understood that most any authentication technique can be employed to authenticate users. By way of example, authentication can be as simple as challenge/response systems (e.g., username, password) to much more sophisticated authentication protocols such as tokens or the like. Some authentication mechanisms employ 'tokens' by way of hardware (e.g., a token or universal serial bus (USB) fob). As well, tokens can be employed via software (e.g., a 'soft token' used in a cell phone or personal digital assistant (PDA)) assigned to a computer user that generates an authentication code every N (e.g., 30 or 60) seconds using a built-in clock and a card's factory-encoded random key (sometimes referred to as the 'seed). The seed (typically 128 bits) is different for each token, and is loaded into the corresponding authentication server when the tokens are purchased.

Token hardware is designed to be tamper-resistant and to deter reverse engineering of the token, thereby greatly enhancing security of the third party storage facility. While a specific implementation of a token/seed mechanism is described, it is to be understood that most any authentication mechanism(s) can be employed to enhance security of the data storage (e.g., eVault) described herein.

Referring again to the methodology of FIG. 2, once a user is authenticated at 216, at 218, the data element can be transmitted to the eVault for storage. The recursive aspects of the methodology can be shown at 218. In other words, as shown, a decision can be made if another data element is to be transmitted to the eVault. If so, the methodology can return to 202 to select the new element. While specific ordering of acts is illustrated, that these acts can occur in different ordering as required (or desired). For instance, in alternative aspects, authentication can occur at the beginning of the session methodology such that re-authentication may not be necessary. However, it may be desired to re-authenticate upon transmittal of each data element. Similarly, data elements can be batch transmitted in accordance with alternative aspects. These alternative aspects are to be included within the scope of this innovation and claims appended hereto.

Still further, although many of the aspects described herein are directed to systems that employ third party managed eVaults, the features, functions and benefits of this innovation can be employed in a personal user environment. Analogizing to physical storage vaults for home use, the features, functions and benefits of the innovation can too be used in these scenarios thereby providing an extra level of security in the event of theft or malicious access.

Figure 3:
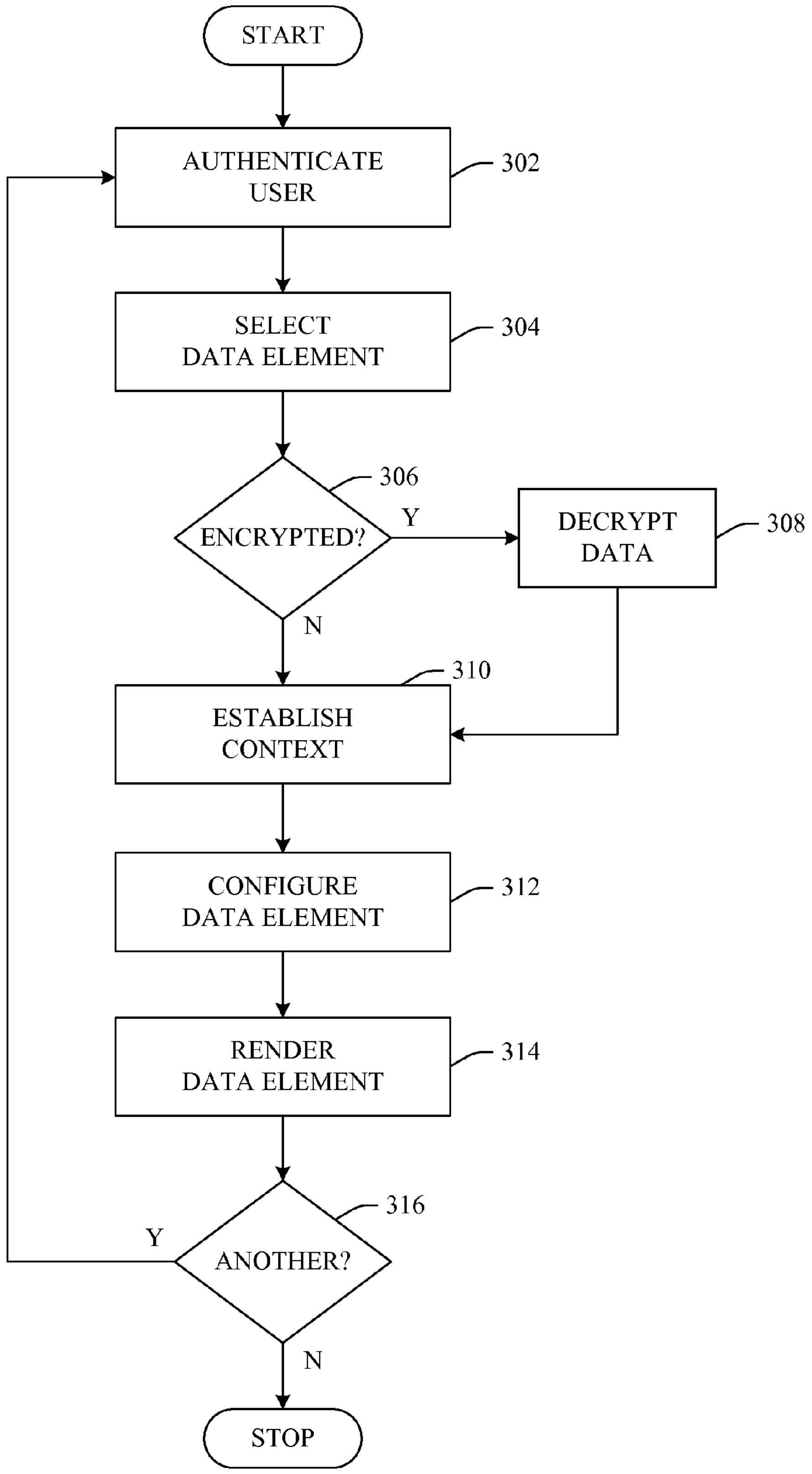
FIG. 3 illustrates an example flow chart of procedures that facilitate access of data from an electronic vault in accordance with an aspect of the innovation.

Referring now to FIG. 3, there is illustrated a methodology of accessing data (or documents) from an eVault in accordance with the innovation. At 302, a user can be authenticated for access to the eVault. Essentially, here, digital identity of the user can be established to permit access to data with the digital storage vault. As described supra, most any authentication mechanisms can be employed in accordance with aspects of the innovation. In addition to establishing the digital identity of a user or user's device, authentication mechanisms might employ challenge/response mechanisms, out-of-band password access, third party intervention, etc. In other words, the innovation can employ redundancy mechanisms in order to ensure or enhance security of the data storage.

Still further, additional human authentication factors may be used to enhance security. For instance, biometrics (e.g., fingerprints, retinal patterns, facial recognition, DNA sequences, handwriting analysis, voice recognition) can be employed to enhance authentication to control access of the storage vault. It will be understood that embodiments can employ multiple factor tests in authenticating identity of a user.

At 304, data elements can be selected in accordance with a user's desire to access. By way of example, a user can specify all or a subset of the data elements (or documents) by which to access. Here, the user can be provided with an index of data elements maintained within the eVault. Additionally, the user can query the vault to determine what type(s) of data is stored therein. Furthermore, the system can employ a document transcript system that, upon deposit or retrieval, automatically transcribes voice files or other audible content, which enables content and key word searching of data elements.

Once the data element(s) is selected, at 306, a determination is made to establish if the stored data was encrypted upon storing. For instance, in a common encryption scheme a public/private key pair can be employed to secure the data. In this scheme, a user retains a private (or secret) key that corresponds to a public key. This public key can be provided to anyone that saves or 'drops' (deposits) data into the eVault on the user's behalf. In doing so, the dropped data can be encrypted using the private key of the public/private key pair.

If it is determined at 306 that the data was encrypted, at 308, the data can be decrypted using the private key of the public/private key pair.

In either situation (e.g., encrypted or not encrypted) context of the user and/or device can optionally be established. For example, sensory technologies can be employed to establish environmental context such as, location, date, time of day, engaged activity, etc. Additionally, device contextual factors can be established, for example, location, owner, security protocols, public/private network, etc. This contextual awareness can assist in both effective rendering of the data as well as adding another layer of access security.

At 312, the data element can be configured in accordance with device characteristics, personal preferences, policies, etc. For example, suppose a user is accessing data elements by way of a handheld device (e.g., smartphone, PDA)—here, the data can be configured in accordance capabilities (e.g., memory, processing power, display real estate) of the device. It will be understood that rendering data to a mobile device can be different that rendering to a standard desktop.

At 314, the data can be rendered in accordance with context, preferences, policy, etc. Examples of rendering the data can refer to printing a hard copy, saving onto a storage device, printing a 'legally presentable' document, transferring the data to a selected target, emailing to a specified target or the like. The innovation described herein is to include these rendering examples, as well as those not mentioned but conceivable by employing the features, functions and benefits of the innovation.

The recursive functionality of the innovation can be seen by the decision block 316. Here, a decision is made if an additional data element is to be retrieved from the vault. If so, the methodology returns to 302 to authenticate the user for access to additional elements. If not, the methodology ends as illustrated.

Figure 4:
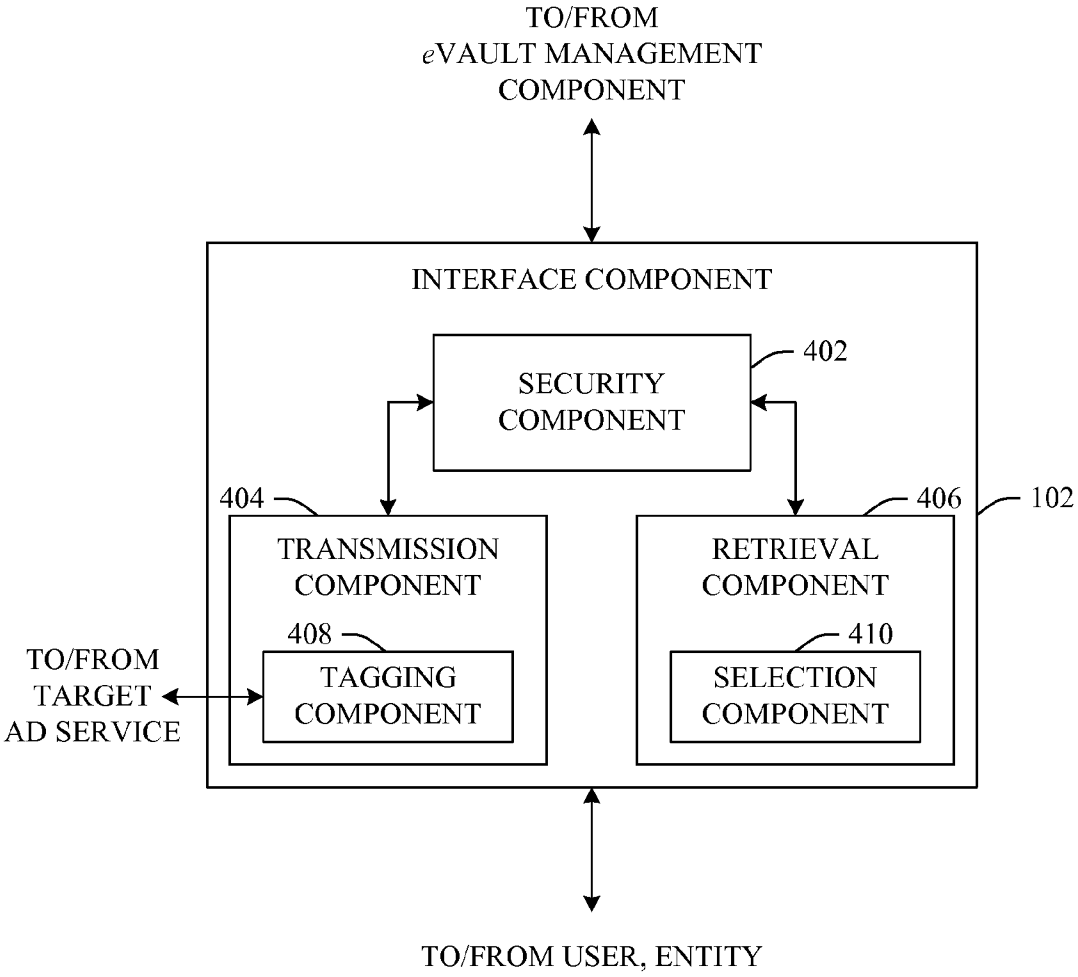
FIG. 4 illustrates a block diagram of an interface component that facilitates secure transmission and retrieval from an electronic vault in accordance with an aspect of the innovation.

Turning now to FIG. 4, a block diagram of an interface component 102 is shown. Generally, the interface component 102 can include a security component 402, a transmission component 404 and an access component 406. As described herein, together, these components enable a user or other entity (e.g., enterprise, downstream financial institution) to securely store and/or retrieve data from an electronic deposit vault. As will be described infra, access (e.g., authentication) can be controlled by the management component (104 of FIG. 1). While these components are illustrated as separate components, it is to be understood that all or a subset of the components (and corresponding functionality) can be collocated in alternative aspects without departing from the spirit and/or scope of the innovation described and claimed herein.

The security component 402 can protect information transmitted and/or received to/from the electronic vault. For instance, the security component 402 can employ cryptographic mechanisms to deter or avoid unintentional or malicious disclosure of data. As will be described in connection with FIG. 4 below, the security component can also enable digital signatures as well as contextual awareness. These features enhance the sophistication and security of the electronic vault functionality.

The transmission component 404 can include a tagging component 408 which tags each data element with metadata upon receipt from a user/entity and upon transmission to the management component (104 of FIG. 1). Additionally, the tagging component 408 can optionally enable an audit or document trail that facilitates target advertising, logging or the like.

The retrieval component 406 can be utilized to access data maintained within a digital storage vault. Here, a selection component 410 can be employed to query or search of a specific data element(s) within the digital storage vault environment. As will be understood upon a review of FIG. 6 infra, the management component (104 of FIG. 1) can be employed to authorize users and therefore control access to data maintained within the digital vault environment.

It is to be understood and appreciated that storage and/or access rights can be granted by the data owner or manager (owner) of the electronic storage vault box. By way of example, rather than a tax preparer giving hard copies of documents to a customer, in accordance with the innovation, the documents can be automatically transferred into the electronic storage vault on behalf of the customer. In operation, the customer can receive notification (e.g., email) of the deposit and can be given choices by which to manage the vault. For instance, the customer can be prompted to view the documents or alternatively, to delete older archived documents. This is but one example of how a third party can 'drop' documents on behalf of a user.

Figure 5:
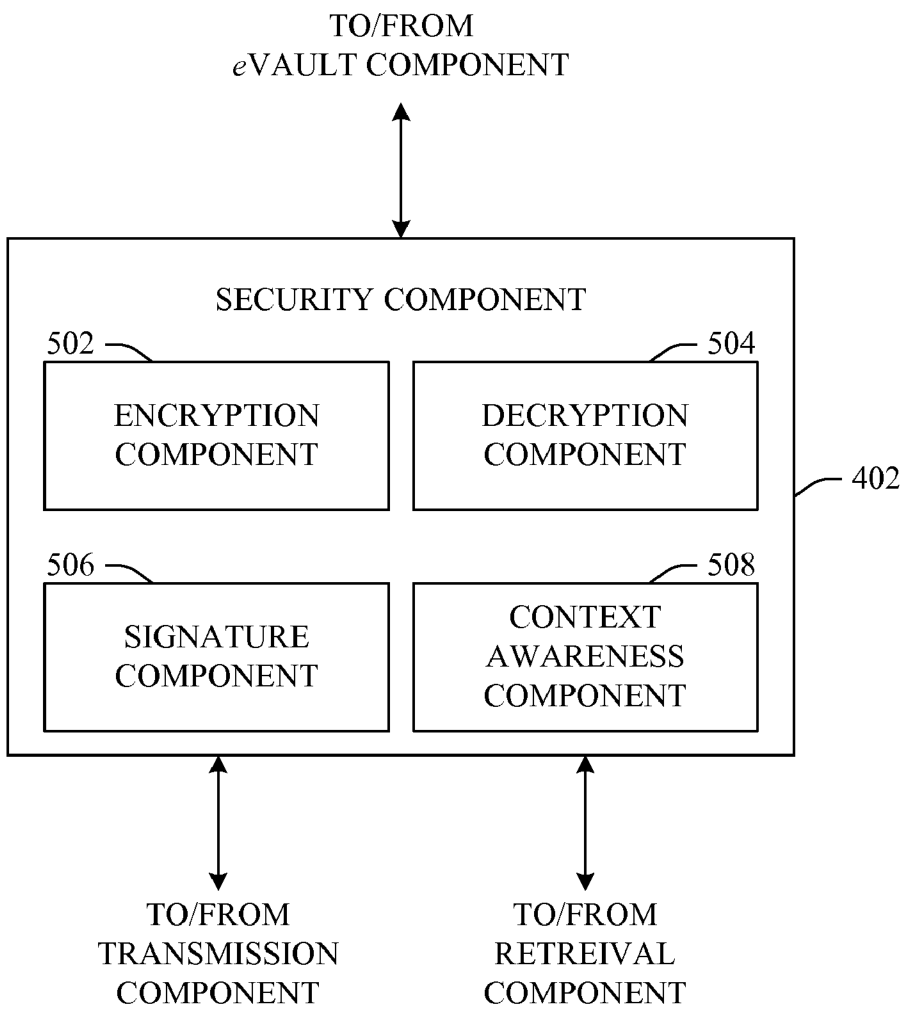
FIG. 5 illustrates a block diagram of a security component in accordance with an aspect of the innovation.

Turning now to FIG. 5, as described above, security component 402 can be used to cryptographically protect (e.g., encrypt) data as well as to digitally sign data, to enhance security and unwanted, unintentional or malicious disclosure. In operation, the security component 402 can communicate data to/from both the transmission component 404 and the retrieval component 406. Essentially, the security component 402 enables data to be protected while transmitting to the vault as well as while stored within the vault.

An encryption component 502 can be used to cryptographically protect data during transmission as well as while stored. The encryption component 502 employs an encryption algorithm to encode data for security purposes. The algorithm is essentially a formula that is used to turn data into a secret code. Each algorithm uses a string of bits known as a 'key' to perform the calculations. The larger the key (e.g., the more bits in the key), the greater the number of potential patterns can be created, thus making it harder to break the code and descramble the contents of the data.

Most encryption algorithms use the block cipher method, which codes fixed blocks of input that are typically from 64 to 128 bits in length. As described above, a decryption component 504 can be used to convert encrypted data back to its original form. In one aspect, a public key can be used to encrypt data upon transmission to the electronic vault. Upon retrieval, the data can be decrypted using a private key that corresponds to the public key used to encrypt.

The signature component 506 can be used to digitally sign data and documents when transmitting and/or retrieving from the electronic storage source. It is to be understood that a digital guarantees that a file has not been altered, similar to if it were carried in an electronically sealed envelope. The 'signature' is an encrypted digest (e.g., one-way hash function) used to confirm authenticity of data. Upon accessing the data, the recipient can decrypt the digest and also re-compute the digest from the received file or data. If the digests match, the file is proven to be intact and tamper free. In operation, digital certificates issued by a certification authority are most often used to ensure authenticity of a digital signature.

Still further, the security component 402 can employ contextual awareness (e.g., context awareness component 508) to enhance security. For example, the contextual awareness component 508 can be employed to monitor and detect criteria associated with data transmitted to and requested from the storage vault. In operation, these contextual factors can be used to filter spam, control retrieval (e.g., access to highly sensitive data from a public network), or the like. It will be understood that, in aspects, the contextual awareness component 508 can employ logic that regulates transmission and/or retrieval of data in accordance with external criteria and factors.

Figure 6:
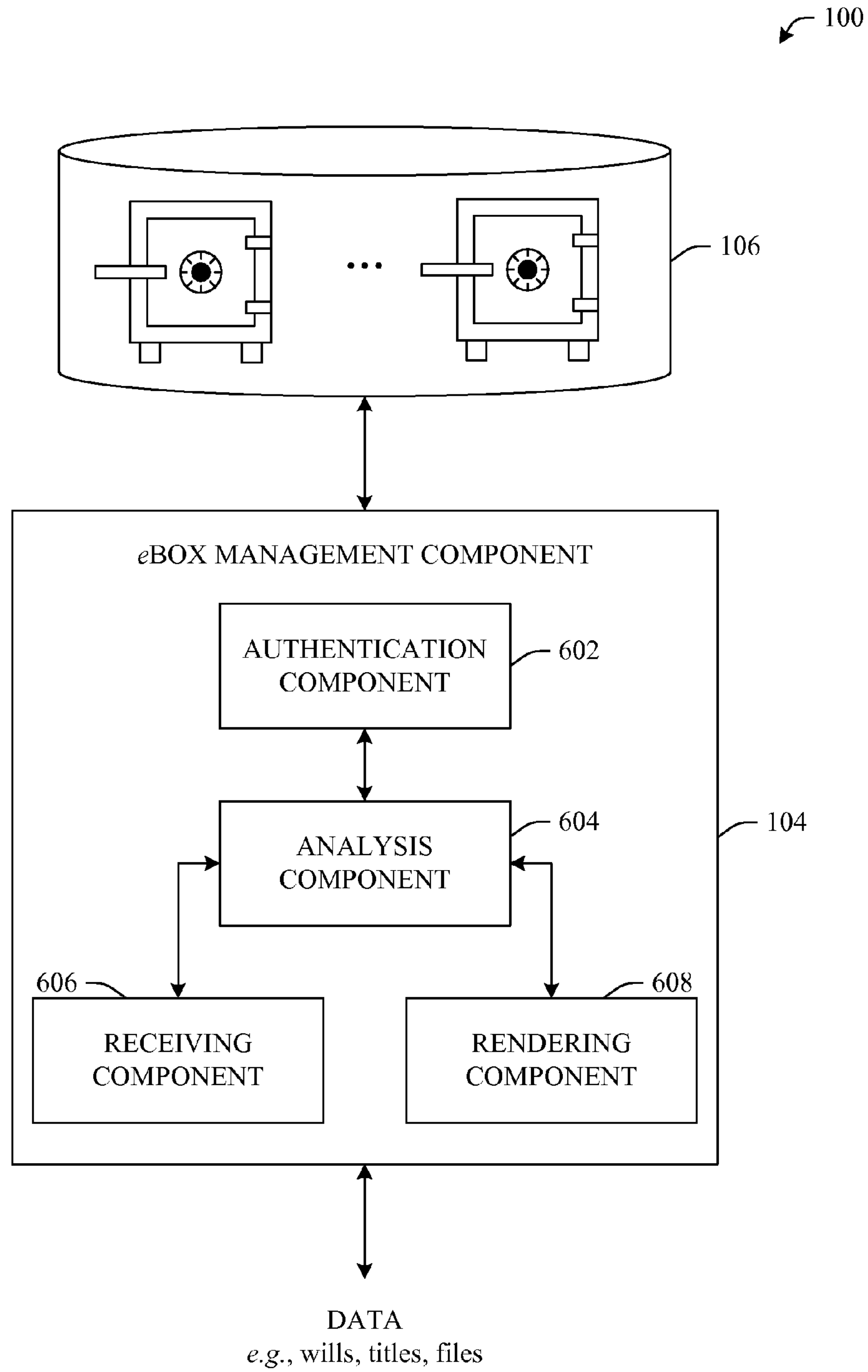
FIG. 6 illustrates a block diagram of a management component that facilitates authentication to control access to an electronic storage vault in accordance with an aspect of the innovation.

Referring now to FIG. 6, a block diagram of an eBox management component 104 is shown. As described above, the management component 104 controls access to the electronic storage vault. Generally, the management component 104 includes an authentication component 602, an analysis component 604, a receiving component 606 and a rendering component 608. In operation, together, these components monitor and limit access to authorized individuals.

The authentication component 602 controls much of the functionality of the management component 104 by applying authentication factors which can establish either digital identity and/or physiological identity of a user. As will be appreciated, digital identity can be established by tracking IP (internet protocol) address, device MAC address or the like. As well, challenge/response authentication methods can be used to verify the legitimacy of users logging into the electronic vault. Here, when a user attempts to log in, the server can use account information (or other identifying criteria) to 'challenge' whereby the user is required to 'respond'. The response is processed, and if valid, a trust relationship is established.

It is to be understood that challenge/response systems can be used in a simple form to verify a user name and password. In more sophisticated examples, tokens or the like can be employed to verify authentication credentials. Some known examples of token authentication employ smart cards kept in the user's possession. These cards often employ a microprocessor that synchronizes with the host by a unique number and time of day. When a user logs into a host, they enter the number displayed on the smart card as a pass code. If the number matches the number that the host computes at that time, the user is presumed to be the valid holder of the card and access is granted.

Alternatively, an electronic key or 'e-key' can be employed to control access to the e-vault. More particularly, the owner (or renter) of the e-vault can optionally be issued an e-key from the third-party that manages the e-vault. In one example, the e-key can be a physical representation of a changing number that can effect or otherwise approve access to the e-vault. Here, only the owner, and optionally the third-party administrator will have a copy of the e-key. Still further, it is to be understood that the e-key can be selected by the owner, the third-party or randomly as desired.

In still other examples, the authentication component 602 can employ biometric analysis and other physiological analysis to confirm actual identity of a user. For instance, fingerprint and retinal scanning mechanisms can be employed to verify actual identity of a user. Other physiological data can be gathered by way of sensory technologies to assist in the authentication process. Still further, environmental data and contextual information can be employed to compliment secure authentication.

In operation, data (or a request for data) can be transmitted via the interface component (e.g., 102 of FIG. 1) to the receiving component 606. The analysis component 604 can evaluate the data (or request for data) to facilitate storage. Here, the analysis can select a proper storage location for the data based upon most any factor including but, not limited to, type, content, sensitivity level, originator, etc. Once analyzed, the data can be saved into a proper storage location or vault in accordance with proper tagging, security, permissions, etc.

In the scenario whereby a request for data is received, if authorized, the data can be retrieved from the storage vault and transmitted via the rendering component 608. As will be described below, the analysis component 604 can employ logic to determine a suitable rendering format by which the rendering component 608 can configure. This configuration can be established in accordance with a particular user or device profile. Moreover, the rendering component 608 can establish 'legally presentable,' 'duplicate' or other version documents in accordance with aspects.

Figure 7:
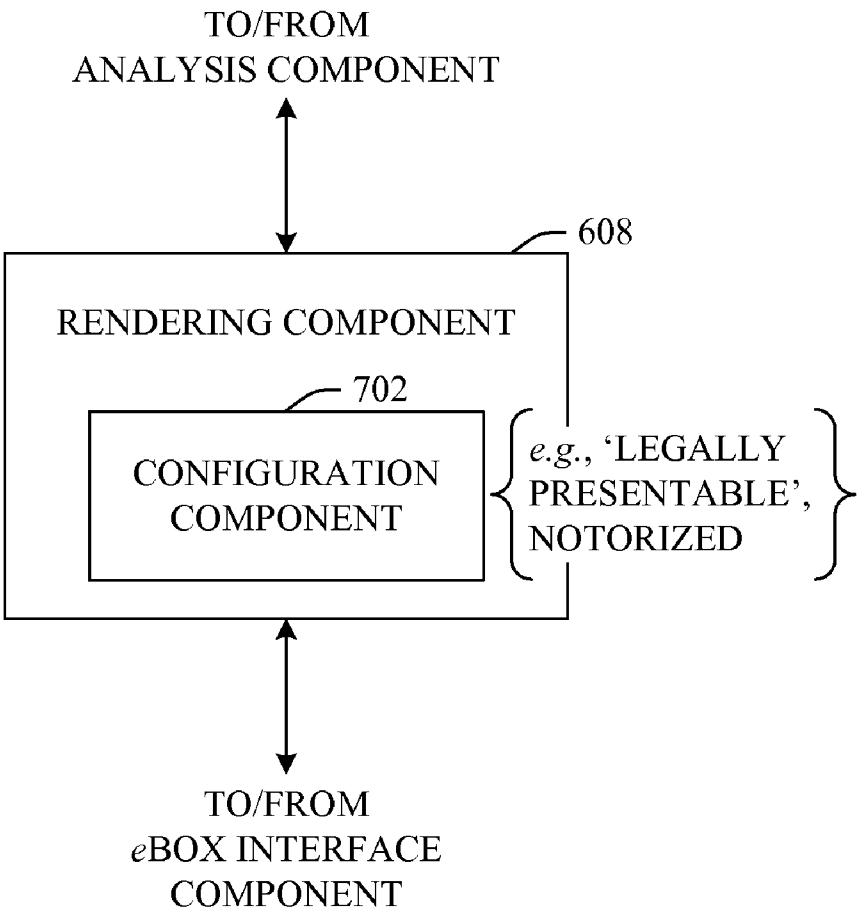
FIG. 7 illustrates an example rendering component that enables printing 'legally presentable' and 'electronically notarized' documents in accordance with aspects of the innovation.

FIG. 7 illustrates a rendering component 608 that includes a configuration component 702. In one embodiment, this configuration component 702 enables documents to be rendered in a 'legally presentable' format. For example, suppose an automobile title is electronically stored within the vault. Upon rendering the document, the configuration component 702 can arrange the document into a format that is legally enforceable. In other words, the newly printed document becomes the 'original.' If desired, upon rendering the 'original,' the electronic document can be deleted from the vault to ensure that other 'original' documents will not be rendered.

Similarly, the configuration component 702 can effectuate electronic notarization of documents. Here, the system can confirm identity of a signor (that electronically signs the document). Upon verification and acceptance of an oath (if applicable), the document can be electronically notarized, which can be a legally binding document. In still other aspects, watermarks or the like can be applied to rendered documents in order to present status and/or authenticity of the documents.

The configuration component 702 can also be employed to arrange a document in accordance with a user and/or device context. For example, sensitive data can be masked if a user's context reveals a necessity to do so. By way of further example, privacy concerns (e.g., masking social security numbers) can be addressed by the configuration component 702 as a function of context. As well, device context can be employed to organize data for render. Here, display real estate, processor capabilities, application availability or the like can be considered when rendering data. In a specific example, if a user wants to render a .pdf format document via a smartphone that is not equipped with the necessary applications, the configuration component 702 can reconfigure the document into a format compatible with the target device (e.g., TIFF or .jpeg format). While the examples are countless, it is to be understood and appreciated that the configuration component 702 can be employed to adhere with policy, preference and limitations of a user and device when rendering data.

Accordingly, the configuration component 702 can employ machine learning and reasoning (MLR) logic to act on behalf of a user. As well, other components described supra can employ MLR logic in alternative aspects of the innovation. These alternative aspects are to be considered within the scope of this disclosure and claims appended hereto.

The subject innovation (e.g., in connection with configuration) can employ various MLR-based schemes for carrying out various aspects thereof. For example, a process for determining how/when to render data in a particular context can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the nontriggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria how to configure a document upon rendering, how/if to mask sensitive data as a function of content and context, etc.

Figure 8:
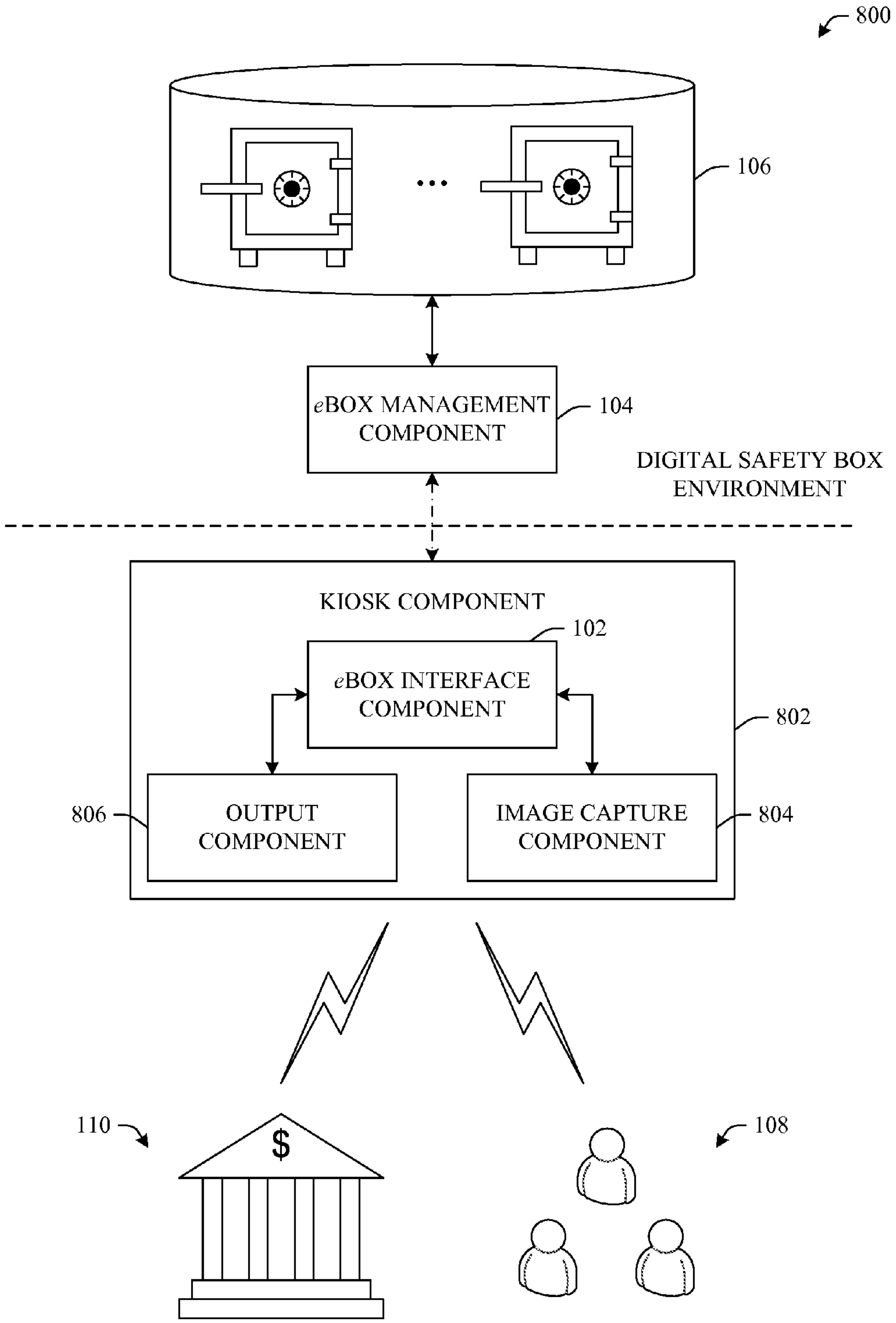
FIG. 8 illustrates an example system that employs a kiosk component to enable a user or entity to transmit and/or retrieve data from an electronic storage vault.

Referring now to FIG. 8, an alternative system 800 is shown in accordance with an aspect of the innovation. Generally, system 800 illustrates an example of a system that facilitates users to deposit data (e.g., documents, files, etc.) into a secure storage vault. As shown, system 800 employs a kiosk 802 (such as an automated teller machine) having an eBox interface 102 and an image capture component 804 (e.g., scanner) therein. In operation, users 108 can employ the image capture component 804 to convert hardcopy documents into electric format. Subsequently, the interface component 102 can be used to transmit the electronic data to the management component 104 and on to the electronic vault 106.

The kiosk component 802 can also include an output component 806, such as a printer, display or the like. As described above, the output component 806 can be used to render the data from the electronic vault 106. In examples, the output component 806 can print 'legally presentable' or 'electronically notarized' documents.

While this example employs a kiosk component 802 as an entry point for a user to submit documents to an electronic vault, it is to be understood that other examples exist which are to be included within the scope of the innovation described herein. In aspects, documents and other data can be uploaded from a personal computer, handheld device, facsimile machine, network terminal, or the like. These examples are to be considered included within this specification and claims appended hereto. In yet other embodiments, software applications can be equipped with functionality the enables automatic transfer to an electronic vault or personal storage location with the vault. By way of example, word processing applications, spreadsheet applications, document management systems, email applications (e.g., automatic ability to save message and/or attachment(s)) or the like can be equipped with a transfer button that triggers transfer to an electronic storage vault. This functionality can be programmed within the application by developers or alternatively added by way of a plug-in or applet.

Figure 9:
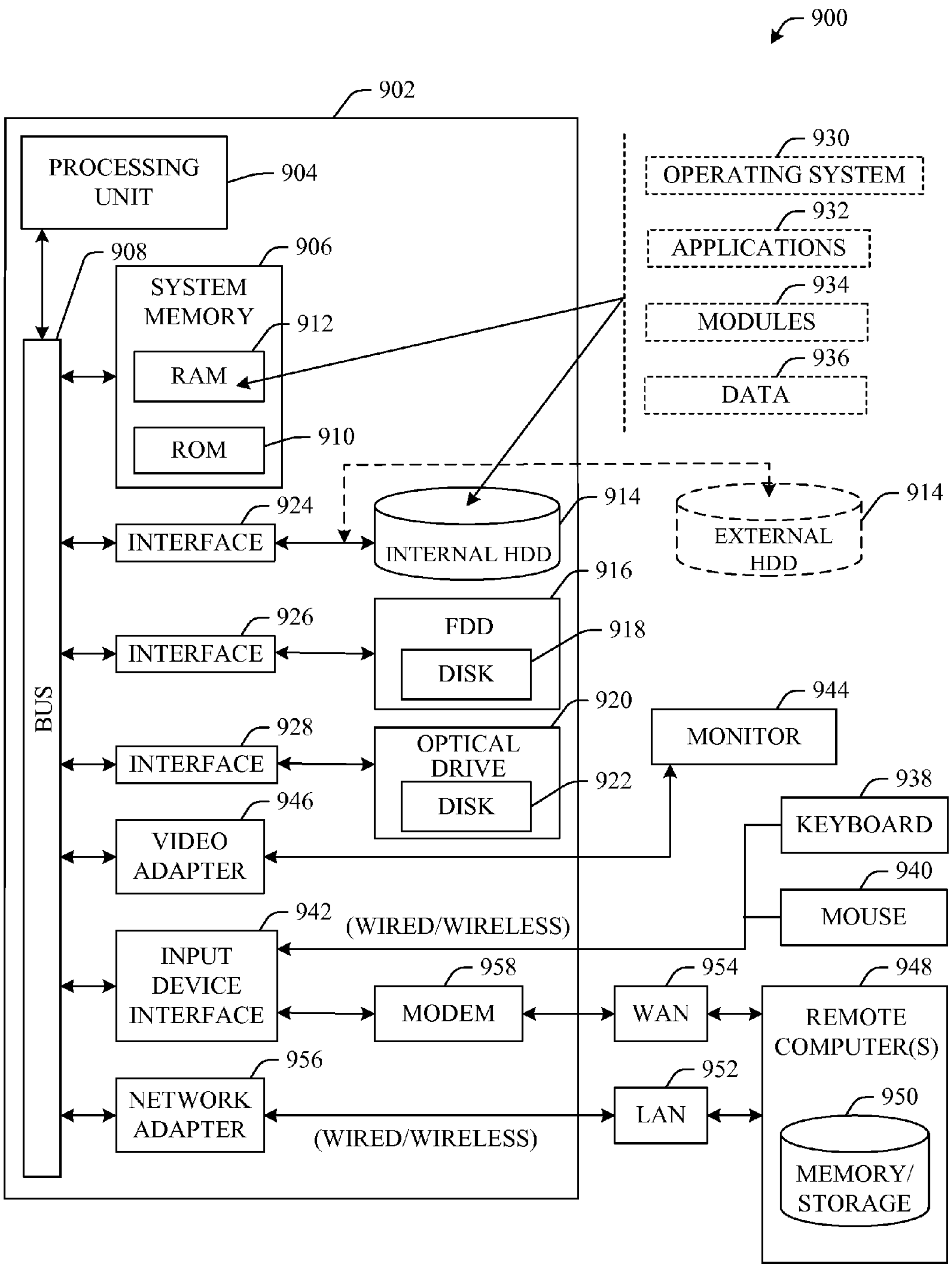
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 10:
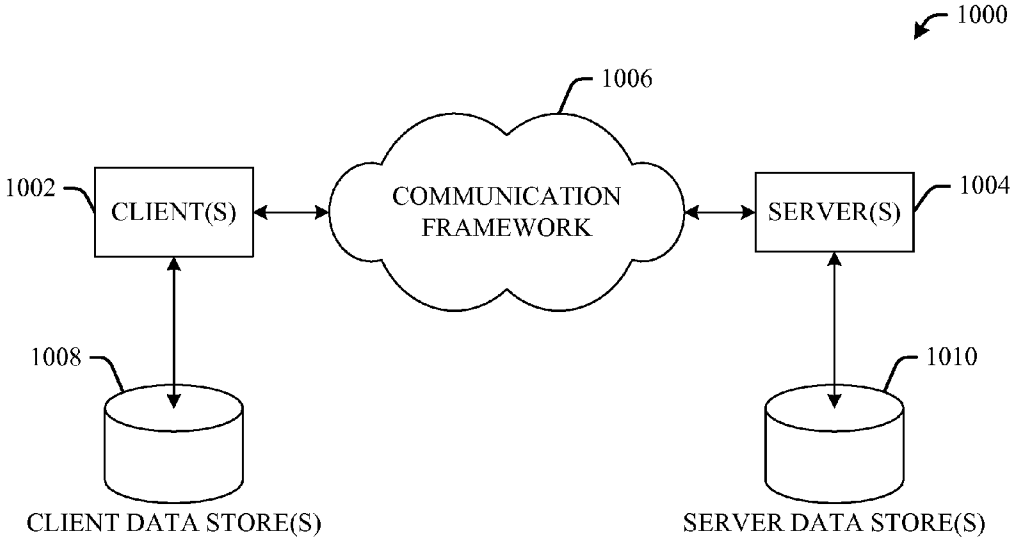
FIG. 10 illustrates a schematic block diagram of an exemplary computing environment in accordance with the subject innovation.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates secure electronic storage, comprising:

at least one processor coupled to a memory, the processor executing:

an interface component that secures a plurality of data elements for storage in an electronic storage vault;

a transmission component that tags a subset of the data elements, wherein the tags are generated based at least in part on content analysis performed on the subset and a context of one or more of a user or a device, and wherein the transmission component generates an audit of the plurality of data elements;

a management component that one of permits or denies access to the electronic storage vault based upon authentication of a user; and a rendering component that configures the subset of the data elements in accordance with at least on of a device location, a device preference, and a device capability, and wherein the subset of the data elements are further configured in accordance with a sensitivity level and an enforceability determination.

2. The system of claim 1, further comprising an authentication component that authenticates the user, wherein access permission is based upon the authentication.

3. The system of claim 2, wherein the authentication is based at least in part upon two or more of hardware tokens, passwords, user credentials, biometric factors, and environmental setting, a device network address, and a device network identifier.

4. The system of claim 3, wherein the biometric factor includes at least one of a DNA sequence, fingerprint, facial scan, retinal scan, handwriting analysis, or voice recognition.

5. The system of claim 1, further comprising a security component that protects the plurality of data elements upon transmission, during storage or upon retrieval, the security component including at least an encryption component that encrypts the subset of the data elements, wherein encryption prohibits unauthorized access to the subset of the data elements.

6. The system of claim 5, further comprising a signature component that digitally signs the subset of the data elements, wherein the signature facilitates determination of authenticity of the subset of the data elements.

7. The system of claim 5, further comprising a context awareness component that employs context of one of a user or a device to permit or deny access and renders the subset of the data elements based at least in part on the context of one or more of the user or the device.

8. The system of claim 7, wherein the context of the one or more of the user or the device includes at least one of a determination related to network security, a determination related to device security, a time of day, a device owner, an owner of the subset of the data elements, a physical device location, and a logical device location.

9. The system of claim 5, wherein the security component detects at least one of malicious software and spam.

10. The system of claim 1, further comprising a retrieval component that enables the user to query the electronic storage vault to access the subset of the plurality of data elements.

11. The system of claim 1, wherein at least a portion of the subset of the data elements comprises audio content that is automatically transcribed upon storage or retrieval.

12. The system of claim 1, wherein at least a portion of the subset of the data elements is created based on a document input by a user locally at an automated teller machine.

13. The system of claim 1, wherein at least a portion of the plurality of the data elements were deposited in the electronic storage vault by an entity that was granted access rights by an owner of the electronic storage vault.

14. The system of claim 1, wherein the rendering component redacts at least a portion of a data element among the plurality of data elements based at least in part on the sensitivity level.

15. The system of claim 1, wherein the enforceability determination is one of a legally presentable or digitally notarized format.

16. The system of claim 1, wherein the audit comprises at least a portion of a document trail that facilitates target advertising.

17. A computer-implemented method of secure storage of data, comprising:

storing computer executable instructions on a memory;

employing a processor that executes the computer executable instructions stored on the memory to implement the following acts:

selecting a plurality of data elements;

authenticating an entity, wherein the entity is authenticated based at least in part on access rights granted by an owner of an electronic storage vault and two or more of hardware tokens, passwords, stored user credentials, biometric factors, an environmental context, a device network address, and a device network identifier;

setting a sensitivity rating of the subset of the plurality of data elements, wherein the sensitivity rating is set based at least in part on predefined policies and a content analysis performed on the subset;

permitting storage of the subset of the plurality of data elements in the electronic storage vault based upon the authenticated entity, wherein the subset of the plurality of data elements are stored as a function of the sensitivity rating;

accessing the subset of data elements; and rendering the subset of data elements, wherein the rendering is at least one of 'legally presentable' or 'electronically notarized' documents.

18. The computer-implemented method of claim 17, further comprising at least one of encrypting or digitally signing the subset of the data elements based at least in part on the sensitivity rating.

19. The method of claim 17, wherein at least a portion of the subset of the data elements is created based on a user submission at an automated teller machine.

20. A computer-executable system that facilitates storage of data, comprising:

a first set of instructions configured to secure the data for transmission to an electronic vault;

a third set of instructions configured to secure the data for storage with the electronic vault;

a fourth set of instructions configured to regulate access to the electronic vault as a function of user authentication; and a fifth set of instructions configured to store the data within the electronic vault, wherein a storage location is determined based at least in part upon two or more of a sensitivity level of the data, a type of the data, an originator of the data, or a content of the data, wherein the fifth set of instructions is further configured to generate an audit of the data, a sixth set of instructions configured to confirm an integrity of the data, wherein confirming the integrity includes at least one of a check to ensure the data has not been corrupted, a check to ensure one or more associated subsets of the data are intact, and a check to ensure no tampering has altered the data;

a seventh set of instructions configured to select a requested subset of the data;

an eighth set of instructions configured to access the requested subset of the data based upon authentication; and a ninth set of instructions configured to render the requested subset of the data;

wherein at least one of the sets of instructions is executed by at least one processor coupled to a memory.

* * * * *